United States Patent
Belanger et al.

(10) Patent No.: US 8,406,129 B2
(45) Date of Patent: Mar. 26, 2013

(54) TECHNIQUE FOR DETERMINING TRANSPORT CAPACITY REQUIRED TO ACHIEVE CONTROLLABLE WORST CASE THROUGHPUT

(75) Inventors: David G. Belanger, Hillsborough, NJ (US); Robert D. Mathews, Sunland, CA (US); Gopalakrishnan Meempat, East Brunswick, NJ (US); Sam Houston Parker, Cranbury, NJ (US); Sarat Puthenpura, Berkeley Heights, NJ (US); Ravi Raina, North Brunswick, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 521 days.

(21) Appl. No.: 12/655,236

(22) Filed: Dec. 23, 2009

(65) Prior Publication Data
US 2011/0149761 A1 Jun. 23, 2011

(51) Int. Cl.
*H04L 12/26* (2006.01)

(52) U.S. Cl. ......................................... 370/230; 370/252
(58) Field of Classification Search .................. 370/229, 370/230, 230.1, 231, 232, 233, 234, 235, 370/395.21; 709/223, 224, 225, 226
See application file for complete search history.

(56) References Cited

U.S. PATENT DOCUMENTS

| | | | |
|---|---|---|---|
| 7,570,588 B1* | 8/2009 | Cahn | 370/232 |
| 7,746,806 B2* | 6/2010 | Racz et al. | 370/252 |
| 2010/0157841 A1* | 6/2010 | Puthenpura et al. | 370/253 |
| 2010/0246534 A1* | 9/2010 | Vargantwar et al. | 370/332 |

* cited by examiner

Primary Examiner — Michael Thier
Assistant Examiner — Feben M Haile
(74) Attorney, Agent, or Firm — Ronald D. Slusky

(57) ABSTRACT

A link in a communications network is provisioned with a particular bandwidth capacity determined as a function of a "sub-par customer data fraction." The sub-par data fraction is given by a) the amount of data transferred under sub-par condition divided by b) the total data transferred, where "sub-par condition" means that data is transferred below a given target bit rate.

13 Claims, 7 Drawing Sheets

TECHNIQUE FOR DETERMINING TRANSPORT CAPACITY REQUIRED TO ACHIEVE CONTROLLABLE WORST CASE THROUGHPUT

BACKGROUND

The present invention addresses the problem of determining how much transport capacity (e.g., in terms of bandwidth) should be provided to a transport facility, e.g., a link in a telecommunications network. Although this problem is one of general applicability in the telecommunications field, it is more specifically illustrated herein in the context of determining how much transport capacity should be provided to a so-called IuB—a wireless network infrastructure facility that hauls voice and data traffic from cell sites to radio network controllers, which manages radio resources. This specification uses the word "link" to refer to any transport facility whose transport capacity is to be determined.

There are two competing considerations when determining how much transport capacity should be provided to a network link. On the one hand, one wants to satisfy the quality metrics promised by the network operator to customers for all kinds of traffic—including, for example, voice, data, and video. Under-engineering of a link, i.e., not providing it with enough bandwidth to meet those metrics, can create serious customer dissatisfaction stemming from traffic congestion. At the same time, link capacity provisioning is a capital intensive undertaking, and over-engineering of transport facilities, i.e., providing more bandwidth than is necessary to ensure that quality metrics are met, can easily overrun the cost of operations and make the an overall operation unprofitable. It is very desirable, therefore, to have link sizing, or "dimensioning," be carried out in a way that balances these two aspects.

In addition, calculations for transport facilities such as IuBs are often done on projected values of voice/data/video demands for planning purposes, and it is important that the dimensioning be at least somewhat resilient to variations from the traffic assumptions to avoid unexpected results.

Until now, the above problem has been solved in the prior art by methods that can be broadly classify into two categories. The first category treats all traffic as "call" type, while taking into account various performance (blocking) criteria utilizing a multi-dimensional Erlang-B (often referred to as Kaufman-Roberts algorithm) modeling approach or its variants. This is a quite straightforward approach but tends to over-engineer link capacities significantly, especially at larger data loads. With the recent explosion of data communication over wireless (3G and beyond), this approach is not financially viable.

The second category is somewhat more refined. Here the analysis separates data traffic into elastic data traffic (data traffic which is not time sensitive, such as file transfers) and stream, or streaming, data traffic (data traffic which is at least somewhat time sensitive, such as video where some buffering is possible) and appropriate queuing models are employed to size the link. Although methodologies in this category exploit the statistical properties of data to realize so-called "statistical multiplexing gain," they allow one to meet quality metrics only in an average sense. That is, they are only able to assure a customer that the customer's average throughput will meet some stated bit rate (e.g., 700 Kbps). Achieving that particular goal may be of little value to a customer whose throughput happens to be below (and possibly significantly below) the average during a given session. Indeed, customers' experiences can vary widely. For example, during a ten-minute session, a throughput of 100 Kbps for five minutes and a throughput of 1300 Kbps for the remaining five minutes will result in a throughput 700 Kbps on average, but can result in substantial customer dissatisfaction due to the poor throughput during the first five minutes. As a matter of fact, the customer may get irritated during the 100 Kbps session and disconnect himself/herself from the network forcefully by initiating a new session, thus may not even see the 1300 Kbps session. In addition, this approach tends to make the utilization levels of a transport facilities very high (close to 100% at large loads), which means there is no room to accommodate forecast variations (on the upside) or changes in traffic assumptions. As a greater number of applications is being introduced, (especially with the advent of devices like the iPhone®), the traffic mix (hence the statistics) can vary unexpectedly, posing problems with this type of link sizing approach.

SUMMARY OF THE INVENTION

In accordance with the present invention, the required capacity of a link to handle a forecasted level of elastic data is computed based on what we call a "sub-par customer data fraction," or SCDF, which is given by a) the amount of data transferred under sub-par condition divided by b) the total data transferred. Here, "sub-par condition" means that data is transferred below a given target bit rate. Our approach assures, to a desired level of statistical probability, that customers' elastic data will have at least a selected minimum throughput.

The invention is illustratively implemented using the well-known M/G/R/-PS queuing model but modified by us to determine the minimum link capacity for elastic data that will meet a target SCDF—rather than a target average throughput, as in the prior art implementations of the M/G/R/-PS model—thereby protecting the network operator from over-engineering the link.

DETAILED DESCRIPTION OF AN ILLUSTRATIVE EMBODIMENT

Figure 1:
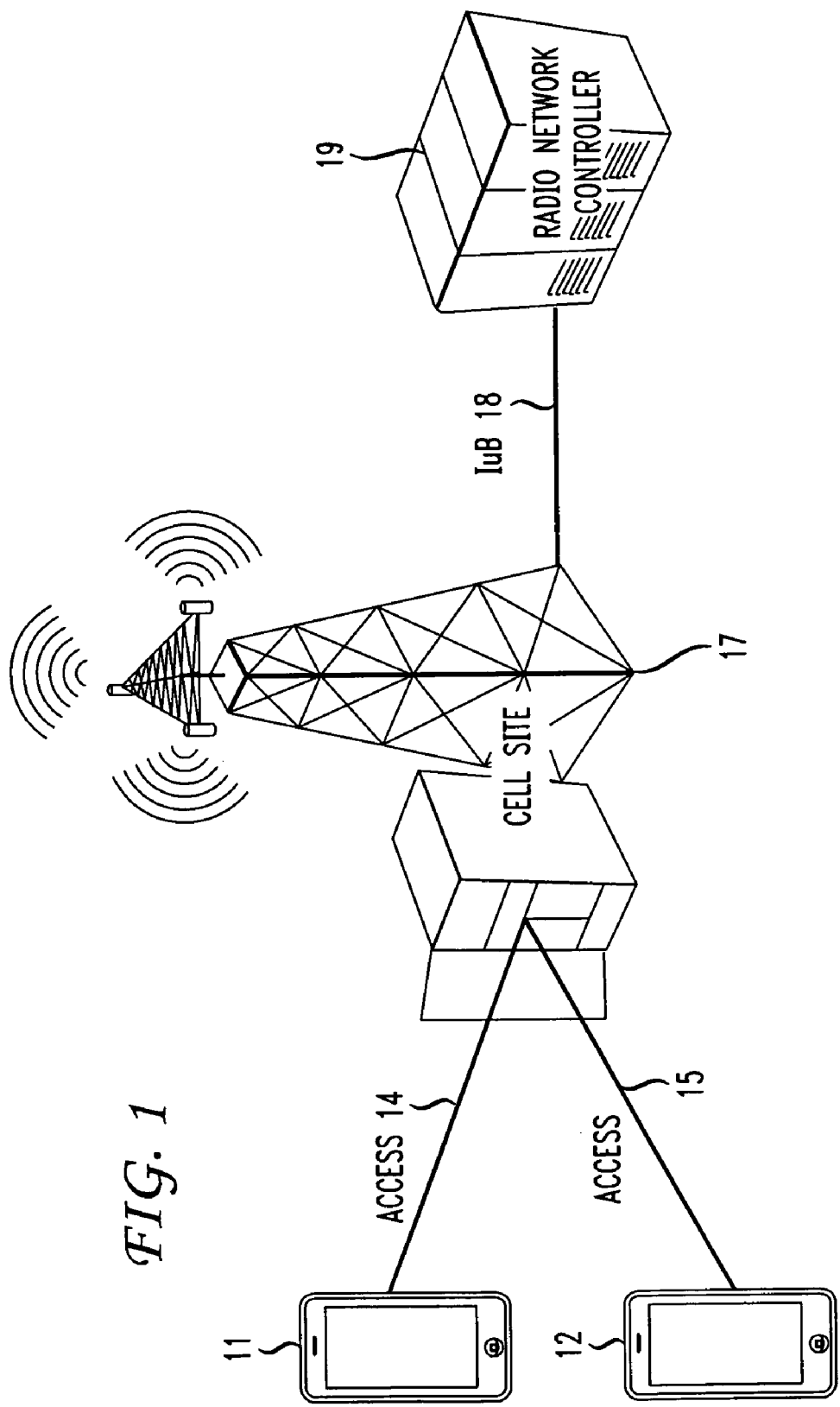
FIG. 1 depicts a system for which the link-capacity-determination method of the present invention can be implemented

FIG. 1 depicts a system for which the link-capacity-determination method of the present invention can be implemented. It is a wireless—illustratively cellular-communications system in which terminals 11 and 12 shown in the FIG. are representative of any one of basic wireless telephones, wireless-network-enabled computers, interne- and/or multimedia-enabled wireless smartphones or other types of user terminals that can now, or may in the future, be able to be connected to a wireless communications system.

Terminals 11 and 12 communicate with a cell site 17 via respective over-the-air access channels 14 and 15. The communications traffic to each of the terminals that cell site 17 is serving at any particular time, is transmitted to the cell site from radio network controller 19 over a so-called "backhaul" link 18 known in the industry as an IuB. Backhaul link 18 similarly carries to radio network controller 19 communications traffic that the terminals transmit to cell site 17.

It is desired to engineer the overall system a) with the goal that at least a desired minimum amount of bandwidth is available throughout the duration of a communications session, or "call," while b) not over-engineering the system, i.e., engineering the system to have significantly more traffic-handling capacity than is needed to achieve that goal. It is more specifically desired in this embodiment to engineer IuB 18 to meet those dual requirements. That is, the bandwidth of IuB 18 should be sufficiently great to ensure that criterion a) above is met to a high degree of certainty. Otherwise, IuB 18 will be a communications bottleneck and terminals 11 and 12 will experience communication delays—particularly delays in receiving data being downloaded from web servers or other computers. At the same time, the owner/operator of the wireless network desires to meet criterion b) so as to keep infrastructure costs down.

It will of course be appreciated that the just-described problem to be solved is not in any way limited to IuBs or to wireless networks. The system shown in FIG. 1 is simply an example of a network in which the present invention may be implemented.

Figure 2:
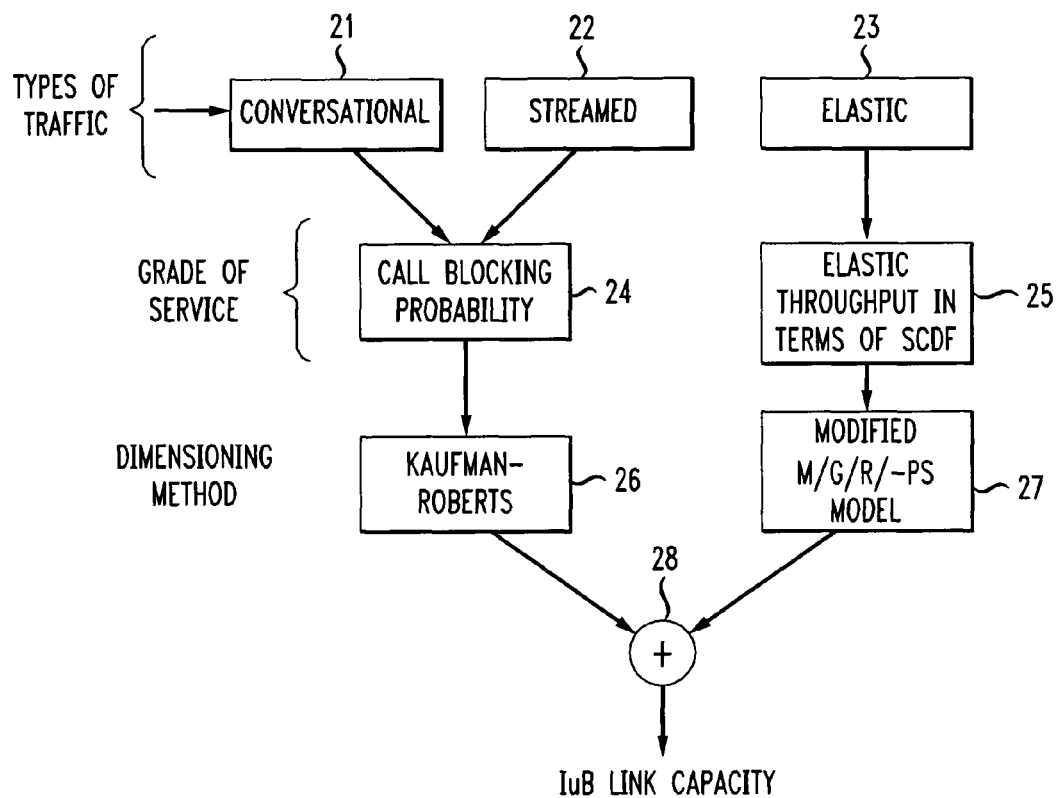
FIG. 2 is a conceptual view of a known approach to engineering the bandwidth of a link modified pursuant to the principles of the present invention.

FIG. 2 is a conceptual view of a known approach to engineering the bandwidth of a link modified pursuant to the principles of the present invention.

Three types of traffic are considered: conversational traffic (e.g. adaptive multirate, or AMR voice), streamed data (e.g. streamed audio), and elastic data (e.g., worldwide web data), respectively denoted at 21, 22 and 23.

Forecasted levels of conversational and streamed data (measured in a unit called Erlangs, which is the number of call-hours in an hour, often during the busiest hour) are input to a multidimensional Erlang-B, or Kaufman-Roberts, algorithm 26 along with information 24 about a desired grade of service, defined in terms of call-blocking probability. The output of the Kaufman-Roberts algorithm is the amount of link bandwidth—in this example bandwidth of IuB 18—necessary to meet performance goals for the conversational traffic and streamed data.

Figure 3:
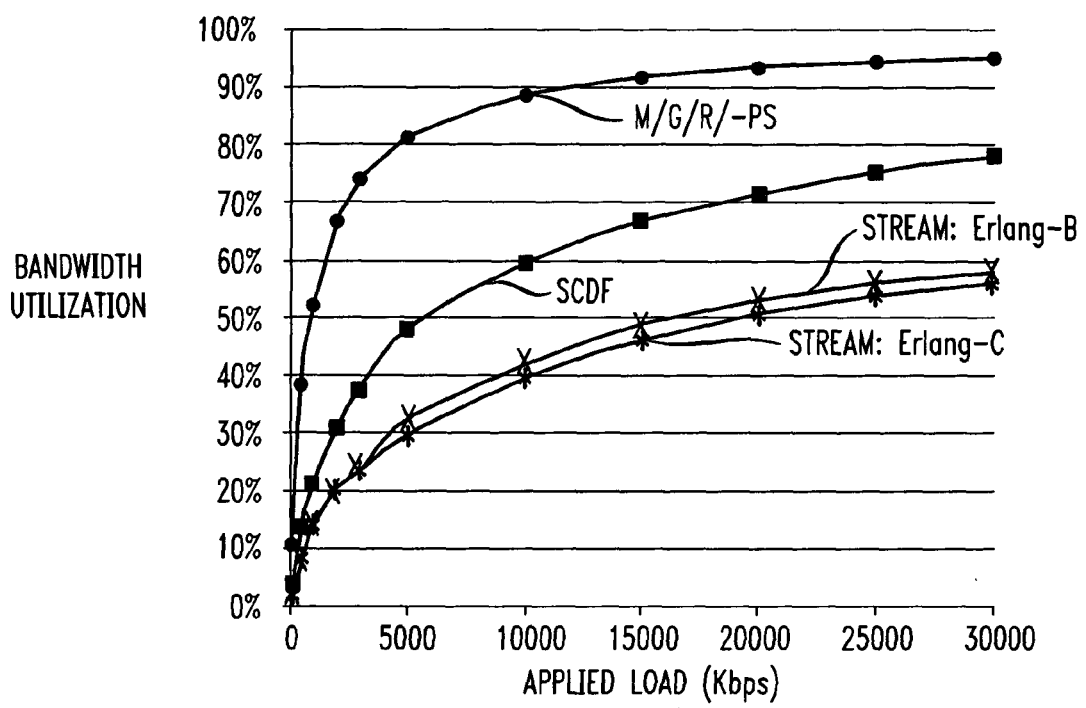
FIG. 3 shows the consequences of utilizing various queuing models—one of which is the technique of the present invention—to determine how much bandwidth a link should have to handle a given amount of elastic data traffic.

Our invention is concerned about determining how much more bandwidth the link should be provided with in order to deal with forecasted levels of elastic traffic 23, and attention is directed to FIG. 3 to see how the invention contrasts with prior art approaches, after which we will return to FIG. 2.

FIG. 3 shows the consequences of utilizing various queuing models—one of which is the technique of the present invention—to determine how much bandwidth a link should have to handle a given amount of elastic data traffic.

One possibility is to treat elastic data traffic as though it were stream traffic for purposes of link capacity computation. In doing this, one can utilize an Erlang type of queuing model to determine the required bandwidth. As seen in FIG. 3 provisioning a link with an amount of elastic-data-traffic bandwidth specified by either the so-called Erlang-B or Erlang-C models results in a significantly over-engineered link. That is, if an Erlang model were to be used to determine how much bandwidth should be included in a link to handle an applied (elastic data) load of 10,000 Kbps, only 40% of that bandwidth would actually get used. So on the one hand, such a link would have no trouble mitigating against the effects of departures from the forecasted load and departures from model assumptions about traffic characteristics. On the other hand, the amount of excess capacity is so much more than necessary to cover such eventualities as to be wasteful. this being somewhat like buying more insurance than needed. This result is, at least in part, a consequence of that fact that the Erlang-B and Erlang-C algorithms do not make use of the statistical nature of the load in order to realize so-called "statistical multiplexing gain" in that, for data traffic, blocking has no relevance, the customer only cares about the throughput (that is the speed in which the data transfer occurs).

Another possibility represented in FIG. 3 is to use the so-called M/G/R-PS algorithm. This algorithm more realistically models the characteristics of elastic data than the Erlang models in that the M/G/R-PS algorithm assumes the random arrival of traffic load and a general load distribution. It also assumes the existence of multiple flows (processes) with guaranteed average data rates, and that the load is shared among these flows (processes). FIG. 3 shows, however, that for loads greater than about 12,000 Kbps, the IuB utilization can be rather high, greater than 90%. This leaves inadequate room to cushion against the effects of departures from the forecasted load and departures from model assumptions about traffic characteristics. Moreover, guaranteeing and achieving nothing more than minimum average data rates per the M/G/R-PS algorithm can still lead to customer dissatisfaction.

In accordance with the present invention, the required capacity of a link to handle a forecasted level of elastic data is computed using the M/G/R-PS model but modified to determine the minimum link capacity for elastic data that will meet a target "sub-par customer data fraction," or SCDF—rather than a target average throughput, as in the prior art implementations of the M/G/R-PS model. The SCDF is given by a) the amount of data transferred under sub-par condition divided by b) the total data transferred. Here, "sub-par condition" means that data is transferred below a given target bit rate. This approach assures, to a desired level of statistical probability, that customers' elastic data will have at least a selected minimum throughput. If each chunk of data (as small as we wish) is thought of as a "customer" and polled for its service experience, then SCDF would signify the fraction of unhappy customers.

In contrast to the prior art approach of engineering a link such that some average throughput per session is achieved, our approach focuses on the SCDF—specifically engineering the link such that its capacity is substantially equal to the minimum capacity for which the SCDF is not exceeded more than some desired threshold, such as 0.1% of the total.

A further advantage is that our approach allows a network operator to assure its customers that they will experience throughputs with a particular harmonic mean, such as a harmonic mean of 1000 Kbps during say an 8 hour window, so that if a customer has a data session for 8 hours and notes the data transfer speed samples over that period, their harmonic mean should be at least 1000 Kbps (assuming a statistically sufficient number of samples).

FIG. 3 shows that our SCDF approach achieves a higher bandwidth utilization than when the Erlang models are used but, unlike the conventional M/G/R-PS approach based on average minimum throughputs, leaves adequate room to cushion against the effects of departures from the forecasted load and departures from model assumptions about traffic characteristics and thus is able to achieve promised minimum instantaneous, as well as harmonic mean, throughputs over a given time frame even in the face of those affects.

Returning, then, to FIG. 2, reference number 25 denotes that a grade of service for elastic data is chosen defined in terms of a desired SCDF, e.g. 90%, and forecasted levels of elastic data, denoted as 23, (measured in Kbps), are input to an M/G/R-PS model 27 that has been modified in accordance with the principles of the invention to use the selected SCDF—rather than average throughput as in the prior art—as the basis for determining an appropriate amount of bandwidth that a link under consideration should have in order to accommodate the expected level of elastic traffic. The total bandwidth that the link should be provisioned with is, as denoted at 28, the sum of a) the bandwidth that, say, the Kaufman-Roberts model determines is needed to accommodate the expected levels of conversational and stream traffic, per block 26 and b) the bandwidth that our modified M/G/R-PS model determines is needed to accommodate the expected levels of elastic traffic per block 27.

Figure 4:
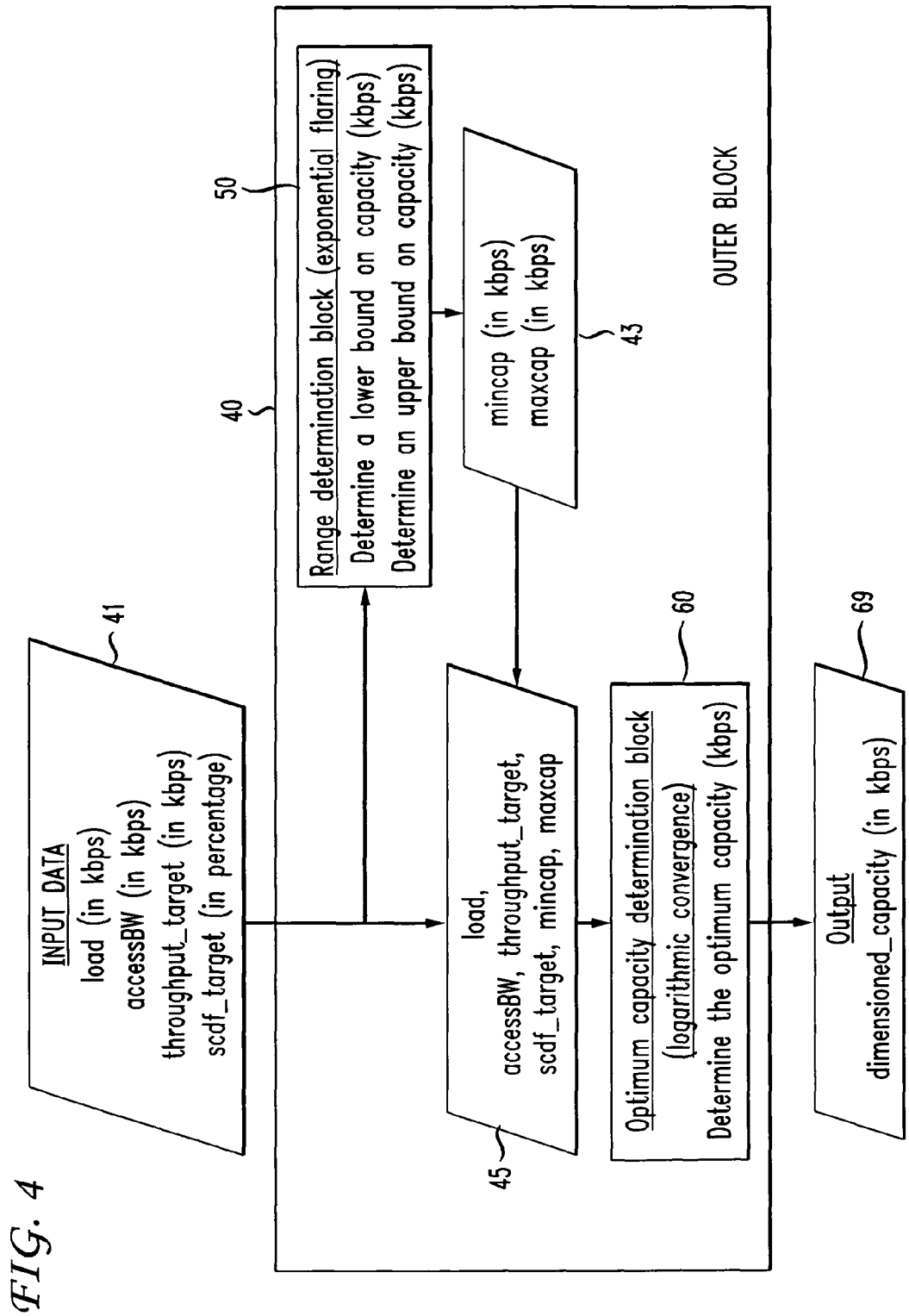
FIGS. 4-7 depict flowcharts of a method implementing the principles of the present invention.
Figure 5:
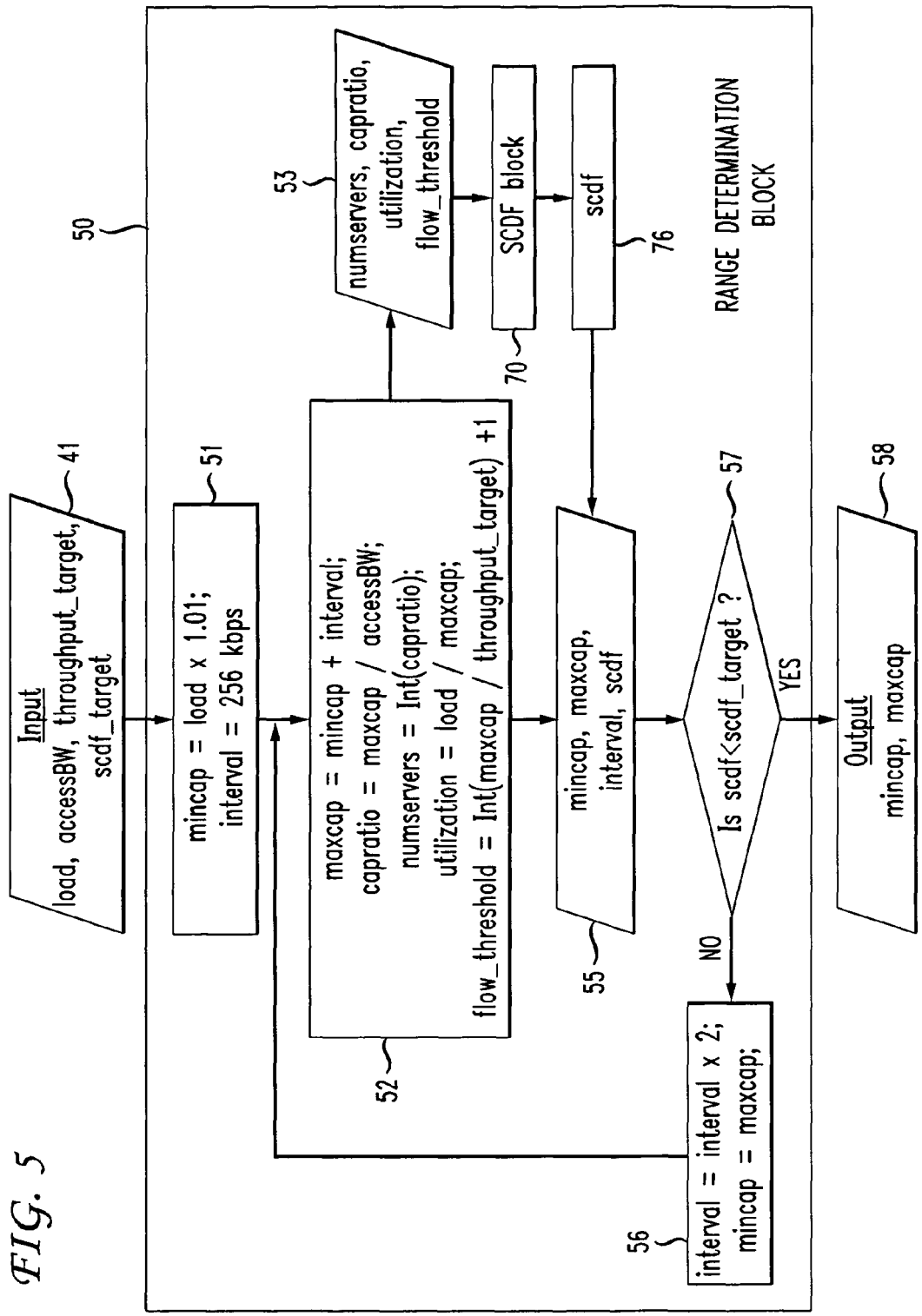
Figure 6:
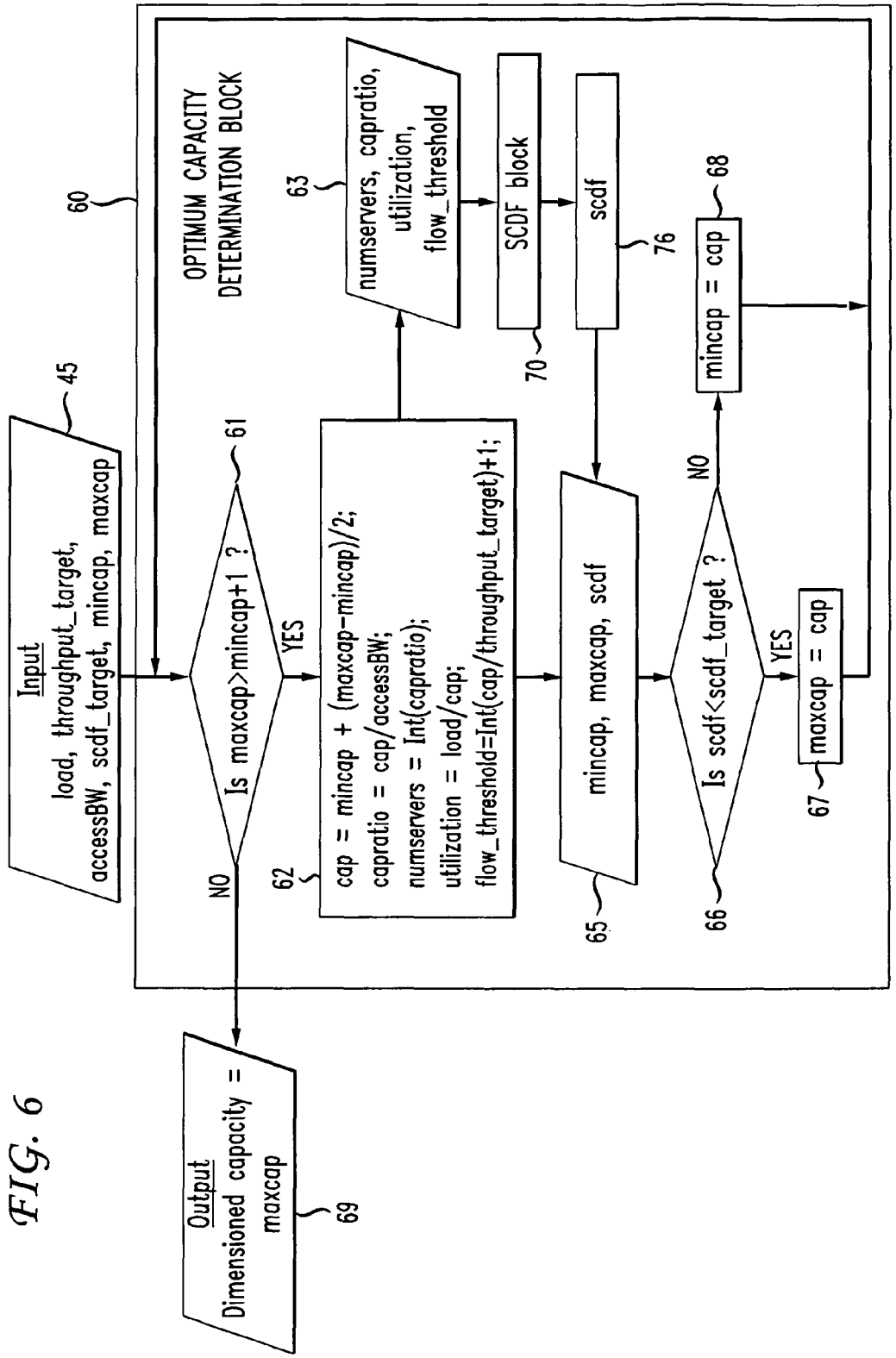

FIG. 4 is a flowchart of an overall M/G/R-PS method or process for implementing block 27, and FIGS. 5 and 6 are flowcharts of blocks 50 and 60, respectively, of the method of FIG. 4. With one exception, the steps of the method depicted in FIGS. 4-6 is similar to the prior art M/G/R-PS approach. The exception is the presence of SCFD block 70, which provides, as an output, the SCDF predicted to be achieved under a particular set of input parameter values and parameter values that are computed as the method proceeds. In the prior art, the output of the block in the position of block 70 would, instead, be the average throughput achieved, given those parameters.

Figure 7:
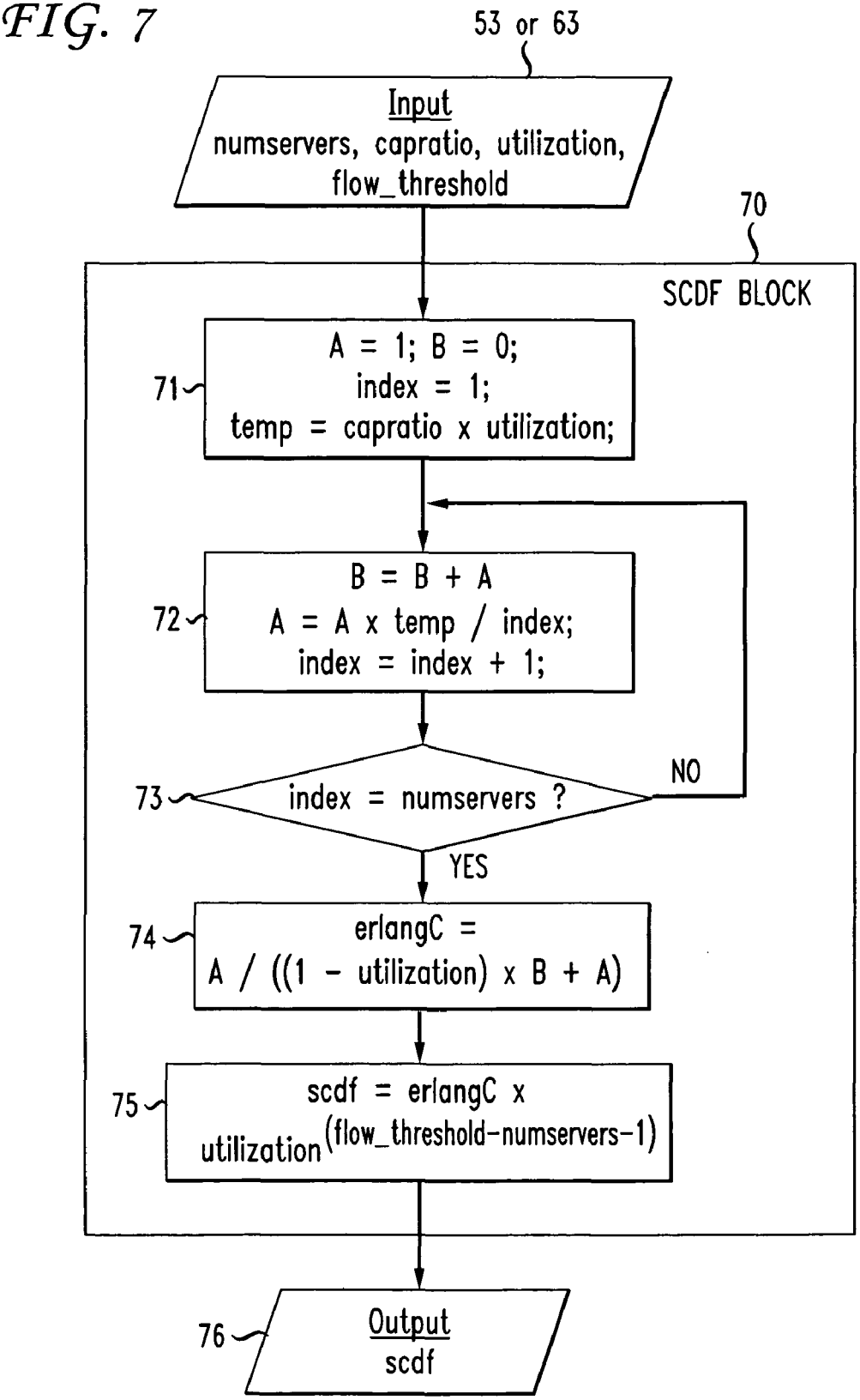

A flowchart of an illustrative implementation of block 70 itself is shown in FIG. 7.

As shown in FIG. 4, the input data 41 for the method comprises the following: load is the expected average load of the link being dimensioned; accessBW is the capacity of the access pipe that is supplying the load via the air interface between the mobile device and the cell site; throughput_target is the desired throughput of the link being dimensioned; and scdf_target is a desired SCDF to be achieved. Illustrative dimensions of these and other parameters in the flowcharts, such as "percentage" for scdf_target and "Kbps" for the other input data 41, are as shown in the FIGS.

Input data 41 is supplied to outer block 40 which, in turn, comprises the two aforementioned blocks 50 and 60. Block 50 is a range determination block that uses exponential flaring to compute, based on the input data 41, lower and upper bounds on the link capacity that is in the process of being determined, denoted mincap and maxcap, respectively.

Input data 41, along with mincap and maxcap are supplied to block 60, as denoted at 45. Block 60 uses logarithmic conversion to determine the optimum dimensioned capacity 69 for the link in question.

Details of an illustrative implementation of range determination block 50 are shown in FIG. 5. Initial values of mincap and of a parameter interval are established at 51. As indicated in the FIG. a value of ($2^8=$) 256 has been found to be a useful starting value for interval, but other powers of 2 may also be found advantageous. Those values, and certain others of the input data parameters 41 are used to establish initial values of parameters maxcap, capratio, numservers, utilization, and flow_threshold, as indicated at 51. (Flow_threshold, in particular is the number of simultaneous flows (in the queuing model) where the throughput target is arrived at.)

Certain of these—numservers, capratio, utilization and flow_threshold are applied to SCDF block 70, which outputs the parameter scdf, this being the SCDF that would be achieved given the current values of those parameters.

The values of mincap, maxcap, interval and scdf are brought down to step 57, which determines whether the just-computed value of scdf is less than the target value scdf_target. If it is, the current values of mincap and maxcap are supplied at 43. Otherwise, new values of interval and mincap are established at 56 and the process iterates beginning at 52 until scdf is, indeed, less than scdf_target.

Details of an illustrative implementation of optimum capacity determination block 60 are shown in FIG. 6. It is first determined whether maxcap>mincap+1. If it is, then the process is done; the dimensioned capacity of the link, dimensioned_capacity 69, is given by the current value of maxcap. Otherwise, the process proceeds to block 62 at which the new values of capratio, numservers, utilization and flow_threshold are determined and provided at 63 as inputs to SCDF block 70 which provides a value of scdf at 76. (Note that because interval is always an integral power of 2 in preferred embodiments, then the quantity (maxcap−mincap)/2 is always an integer.) The just-computed value of scdf, along with mincap and maxcap are brought down to step 66 which determines whether the just-computed value of scdf is less than the target value scdf_target. If it is, then maxcap is given a new value equal to the parameter cap that had been computed at 62. If not, then mincap is given that value. The process then iterates beginning at step 61 until the values of maxcap and mincap converge to within an acceptable limit (say 1 Kbps) at which point dimensioned_capacity 69 is taken to be equal to maxcap.

It may be noted that the value of scdf that is provided by block 70 at any given time is based on some value that is being tried out as a possible value for the determined_capacity. In the case of scdf being determined in block 50, the value being tried out is maxcap. Note that the values of inputs 43 ultimately all depend on the value of maxcap; in the case of scdf being determined in block 60, the value that is being tried out is cap, the value of which is a capacity half-way between the previously-determined values of mincap and maxcap. Note that the values of inputs 63 all depend on the value of cap.

Indeed, the processing carried out by block 60 can be seen as a process of successive approximation or convergence. The value of cap is always halfway between the current values of mincap and maxcap, as noted above. Thus the value of maxcap is decreased upon it being found that that scdf<scdf_target for a given value of cap, because in that event the optimum capacity has been shown to be smaller than the current value of cap (except possibly at the last stage of the convergence). And similarly the value of mincap is increased upon it being found that the criterion scdf<scdf_target is not met for a given value of cap because in that event the optimum capacity has been shown to be larger than the current value of cap (again, except possibly at the last stage of the convergence).

Alternatively stated, it can be seen from FIG. 6 that the value of cap—which starts out at an assumed value based on the original values of mincap and maxcap—is adjusted to a lower value if the SCDF target would be met (i.e., scdf<scdf_target) and is adjusted to a higher value otherwise, with the process repeating until successive values of cap are within a predetermined distance of one another (step 61).

Details of an illustrative implementation of SCDF block 70 are shown in FIG. 6. Block 70 implements computations at 71 and 72 and then determines at 73 whether the value of a parameter index that was initially established at 71 and then updated at 72 is equal to the value of the parameter numservers. If it is not, the process returns to 72 until the condition at 73 is met. At that point the value of a parameter erlangC is determined at 74 and that value is used at 75, along with others of the block 70 input values to determine the value of scdf at 70.

The computations in boxes 71, 72, 73 are steps that may be used in a typical software implementation in calculating the SCDF, being basically an implementation of the mathematical formulation to calculate the SCDF. A more rigorous mathematical exposition of the computation of scdf is that the SCDF is a tail probability measure for dimensioning the IuB. Those skilled in the art will recognize the correspondence between the mathematical expressions appearing in FIG. 7 and those appearing the mathematical exposition below.

Specifically, assume for the sake of illustration that the access pipe capacity of each individual user is denoted by A (Kbps), the guaranteed throughput target for each user is denoted by T (Kbps), and the capacity of the IuB or other shared link being dimensioned is denoted by C (Kbps). It may readily be verified that while the queuing system is in any of the states i=1, ..., R (where i represents the number of data sessions concurrently in progress, and R represents the number of servers given by Int(C/A)), the IuB or other link is transmitting Ai payload kbits per second, and while in any state i>R, the link is transmitting C payload kbits per second (i.e., saturation). It may be further observed that while in any of the "green" states i<N=Int(C/T)+1, all the payload data bits being transmitted experience the targeted grade-of-service of T Kbps, while in any of the "red" states i>N, all the payload data bits being transmitted experience sub-par grade-of-service. Now, if $P_i$, i=0, ..., ∞, denote the state probabilities, i.e., the fraction of the time that there are i transactions in progress, then it can be seen that $$SCDF = \frac{\sum_{i=N}^{\infty} CP_i}{\sum_{i=1}^{R} iAP_i + \sum_{i=R+1}^{\infty} CP_i}$$

which, after mathematical simplification, reduces to $$SCDF = \rho^{N-R-1} E_2(R, K\rho)$$

where $E_2(R, K\rho)$ represents the Erlang-C formula given by $$E_2(R, K\rho) = \frac{\frac{(K\rho)^R}{R!}}{(1-\rho)\sum_{i=0}^{R-1}\frac{(K\rho)^i}{i!} + \frac{(K\rho)^R}{R!}}$$

in which
C=link capacity (in Kbps),
L=applied elastic data load in Kbps,
A=access pipe capacity (in Kbps),
T=specified throughput target (in Kbps),
K=the ratio given by (C/A),
R=number of servers given by Integer (K),
N=the threshold state given by [Integer(C/T)+1], and
ρ=the normalized load given by L/C.

The foregoing merely illustrates the principles of the invention

For example, on the one hand, range determination block is an advantageous step in the overall process by establishing upper and lower bounds for optimum capacity determination block 60 to work with. However, block 60 might alternatively begin with presumed extreme values of mincap and maxcap which ultimately would converge at step 61 to arrive at the dimensioned_capacity. The computation time required by block 50, however, will typically be more than made up for in the reduction of computation time required by block 60 made possible by being able to start with the computed mincap and maxcap values provided by block 50.

It will thus be appreciated that those skilled in the art will be able to devise various alternatives that, although not explicitly shown or described herein, embody the principles of the invention and thus are within its spirit and scope.

The invention claimed is:
1. A method comprising:
determining, for a network infrastructure transport facility, a bandwidth capacity that is required in order for the network infrastructure transport facility to be able to handle a forecasted level of elastic data, said determining being based on an assumed set of input data that is to be transferred over the network infrastructure transport facility, the input data including at least one assumed amount of elastic data traffic and at least one performance target parameter value for the network infrastructure transport facility,
provisioning the network infrastructure transport facility to have the determined bandwidth capacity, and
transmitting communications traffic over the provisioned network infrastructure transport facility,
wherein the determining is based on the computation of a sub-par customer data fraction, the sub-par customer data fraction being given by, for a total amount of payload data transferred over some period of time, the ratio of
a) the amount of the payload data that would be transferred across the network infrastructure transport facility at below a given target data rate, given the input data, when the network infrastructure transport facility has the particular bandwidth capacity, to b) the total amount of payload data transferred,
wherein the determining comprises
a) assuming a particular value for a parameter cap for the capacity of the network infrastructure transport facility,
b) determining whether a sub-par customer data fraction, based on the input data and based on the network infrastructure transport facility having a capacity equal to the current value of cap, would be adequate to meet a sub-par customer data fraction target value,
c) adjusting the value of cap to a lower value if the target value would be met,
d) adjusting the value of cap to a higher value if the target value would not be met, and
e) repeating steps b) through d) until successive values of cap are within a predetermined distance of one another,
and wherein said ratio is

$$SCDF = \frac{\sum_{i=N}^{\infty} CP_i}{\sum_{i=1}^{R} iAP_i + \sum_{i=R+1}^{\infty} CP_i}$$

wherein
SCDF is the sub-par customer data fraction,
i=a number of data sessions concurrently in progress,
$P_i$, i=0, ..., ∞, denote the fraction of the time that there are i data transfer sessions in progress,
C=link capacity (in Kbps),
A=access pipe capacity (in Kbps),
T=specified throughput target (in Kbps),
K=the ratio given by (C/A),
R=number of servers given by Integer (K), and
N=the threshold state given by [Integer(C/T)+1].

2. The method of claim 1 wherein the network infrastructure transport facility is a network infrastructure transport facility of a wireless communications system.

3. The method of claim 2 wherein the wireless communications system is a cellular communications system.

4. The method of claim 3 wherein the network infrastructure transport facility is a backhaul link.

5. The method of claim 4 wherein the cellular communications system includes at least one cell site and at least one radio network controller and wherein the backhaul link carries communications traffic from the at least one cell site to the at least one radio network controller.

6. The method of claim 5 wherein the communications traffic includes elastic data traffic.

7. A method comprising:

determining a bandwidth capacity for a communications link based on input data, the input data including at least one assumed elastic data traffic parameter value and at least one link performance target parameter value, provisioning the communications link to have the determined bandwidth capacity, and transmitting communications traffic over the provisioned communications link, wherein the determining is based on the computation of a sub-par customer data fraction, the sub-par customer data fraction being given by, for a total amount of payload data transferred over some period of time, the ratio of a) the amount of the payload data that would be transferred below a given target data rate, given the input data, when the link has particular bandwidth capacity, to b) the total amount of payload data transferred, and wherein said ratio is $$SCDF = \frac{\sum_{i=N}^{\infty} CP_i}{\sum_{i=1}^{R} iAP_i + \sum_{i=R+1}^{\infty} CP_i}$$

wherein
SCDF is the sub-par customer data fraction,
i=a number of data sessions concurrently in progress,
$P_i$, i=0, ..., ∞, denote the fraction of the time that there are i data transfer sessions in progress,
C=link capacity (in Kbps),
A=access pipe capacity (in Kbps),
T=specified throughput target (in Kbps),
K=the ratio given by (C/A),
R=number of servers given by Integer (K), and
N=the threshold state given by [Integer(C/T)+1].

8. The method of claim 7 wherein the communications link is a network infrastructure transport facility.

9. The method of claim 8 wherein the network infrastructure transport facility is a network infrastructure transport facility of a wireless communications system.

10. The method of claim 9 wherein the wireless communications system is a cellular communications system.

11. The method of claim 10 wherein the network infrastructure transport facility is a backhaul link.

12. The method of claim 11 wherein the cellular communications system includes at least one cell site and at least one radio network controller and wherein the backhaul link carries communications traffic from the at least one cell site to the at least one radio network controller.

13. The method of claim 12 wherein the communications traffic includes elastic data traffic.

\* \* \* \* \*